United States Patent
Shapiro

[15] 3,668,518
[45] June 6, 1972

[54] INSTRUMENT FOR TESTING THREE-WIRE ELECTRICAL OUTLETS

[72] Inventor: Alan R. Shapiro, Sharon, Mass.
[73] Assignee: Bio-Design, Incorporated, Stoughton, Mass.
[22] Filed: Apr. 3, 1970
[21] Appl. No.: 25,409

[52] U.S. Cl..................................................324/51, 324/66
[51] Int. Cl........................................................G01r 31/02
[58] Field of Search..............................324/51, 66; 340/255

[56] References Cited

UNITED STATES PATENTS

| | | | |
|---|---|---|---|
| 3,205,436 | 9/1965 | Donahue | 324/51 |
| 3,383,588 | 5/1968 | Stoll et al. | 324/51 |
| 3,317,825 | 5/1967 | Huff | 324/66 X |
| 3,559,200 | 1/1971 | Walters | 324/51 |

FOREIGN PATENTS OR APPLICATIONS

| | | | |
|---|---|---|---|
| 1,066,236 | 6/1954 | France | 324/51 |
| 1,271,825 | 7/1968 | Germany | 324/51 |
| 189,684 | 4/1957 | Austria | 324/66 |

OTHER PUBLICATIONS

Loewe, R. Check That Ground, Allis Chalmers Electrical Review 2nd Quarter 1948 FIGS. 1–5

*Primary Examiner*—Gerard R. Strecker
*Attorney*—Rosen & Steinhilper

[57] ABSTRACT

The disclosure depicts apparatus for testing wiring connection patterns in a three-wire AC electrical outlet, comprising a three-wire plug adapted for insertion into an outlet and comprising a line probe, a neutral probe, and a ground probe. In the embodiments illustrated a test circuit connected to the plug includes circuit branches between each of the probes and a common terminal, the branches containing resistance means having different resistance values. An AC electrical meter is connected in one of the circuit branches such that deflection of the needle is proportional to the absolute current flow in that branch and also in the test circuit as a whole. Different wiring connection patterns in a tested outlet produce different series-parallel connections of the circuit branch resistances and thus establish different current flows in the branch including the meter. The meter has a scale upon which a plurality of discrete zones are marked with indicia characterizing the various outlet wiring connection patterns which are possible. Upon insertion of the plug into an outlet, the meter needle is deflected to a particular zone on the scale, thus identifying the particular wiring connection pattern existing in the tested outlet. The location of the needle in the zone gives an indication of absolute line voltage in the outlet. Two disclosed embodiment include a resistor connected between the neutral and ground probes such that an open neutral connection in the outlet may be detected.

8 Claims, 14 Drawing Figures

PATENTED JUN 6 1972 3,668,518

INVENTOR
ALAN SHAPIRO

BY ROSEN & STEINHILPER

ATTORNEYS

INVENTOR
ALAN SHAPIRO
BY
ROSEN & STEINHILPER
ATTORNEYS 3,668,518

INSTRUMENT FOR TESTING THREE-WIRE ELECTRICAL OUTLETS

BACKGROUND OF THE DISCLOSURE

The problem of assuring the proper wiring of three-wire AC electrical outlets has been long recognized, as manifested by national and local codes regulating the installation and checking of electrical outlet connections before the outlet can be put into service. However, in spite of legal precautions, each year hundreds of people are injured or killed due directly to improperly wired three-wire AC outlets. The need for accurate, convenient, and fast outlet testing equipment is thus obvious and urgent.

The six basic wiring connection patterns which must be checked to verify the propriety of the connections in a three-wire AC outlet are: 1) no line voltage; 2) open ground; 3) open neutral; 4) reversed hot and ground connections ("hot ground"); 5) reversed hot and neutral connections ("reversed polarity"); and 6) correct connections.

The testing of wiring connection patterns in three-wire AC electrical outlets has in the past been accomplished in various ways. The earliest and most common method was simply to check the terminal voltages in a wired outlet with a meter. Instruments for implementing this approach have been devised; one such instrument is described in U.S. Pat. No. 3,205,436. This method is extremely slow, even with the aid of an instrument since a number of tests must be performed on each outlet, for example to determine whether or not a zero meter reading means an open line, open neutral, or open ground connection. Further, instruments following this approach are apt to be incapable of detecting all the basic wiring connection patterns, thus leaving in some instances an ambiguity as to the nature of the wiring error.

A second approach, typified by U.S. Pat. No. 3,317,825 - Huff, involves the use of an instrument comprising three neon lamps, one connected across each pair of probes in a three-wire AC plug. Insertion of the plug into an outlet causes one or more of the lamps to be energized, particular patterns of excited lamps indicating particular wiring connection patterns in the outlet.

While instruments of this type have been a timesaver in the testing of electrical outlets, they have a number of deficiencies. First, their use of incandescent or neon lamps renders them incapable of producing an indication of absolute current of voltage. These instruments merely signal that sufficient voltage to excite the lamp is present. With such instruments the line voltage can be seriously deficient without registering explicitly on the instrument. This limitation imposes a severe restriction on the versatility and usefulness of such instruments. Secondly, because of the absence of a signal (lamp off) forms a part of the signaling system, there always exist the possibility with such instruments that an incorrect signal may be given because of a defective lamp or lamp circuit. Third, the interpretation of the pattern of excited lamps is wasteful of time and effort.

OBJECTS OF THE INVENTION

It is an object of this invention to provide an instrument for testing wiring connection patterns in a three-wire AC electrical outlet which is extremely simple and fast in use, and which is capable of positively and unambiguously detecting and identifying all of the basic outlet wiring connection patterns which can exist in an outlet.

Further objects and advantages of the invention will in part be obvious and will in part become apparent as the following description proceeds. The features of novelty which characterize the invention will be pointed out with particularity in the claims annexed to and forming a part of this specification.

DESCRIPTION OF THE FIGURES

For a fuller understanding of the invention, reference may be had to the following detailed description taken in connection with the accompanying drawings wherein.

In the drawing figures, like reference numerals denote like structure.

DESCRIPTION OF THE PREFERRED EMBODIMENTS

Figure 1A:
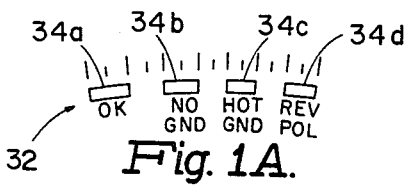
FIG. 1A is an enlarged fragmentary view of a portion of a meter scale shown in the FIG. 1 instrument.
Figure 1:
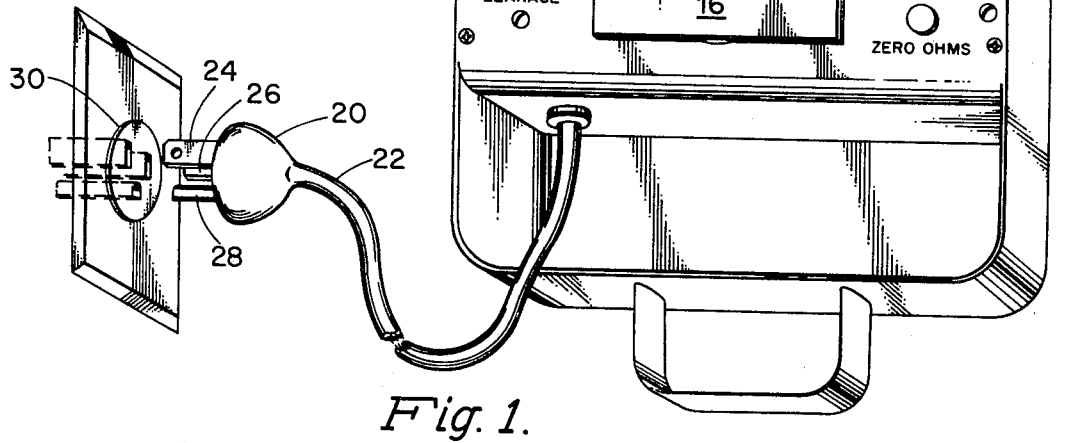
FIG. 1 is a perspective view of a three-wire AC outlet test instrument constructed according to the teachings of this invention.
Figure 2:
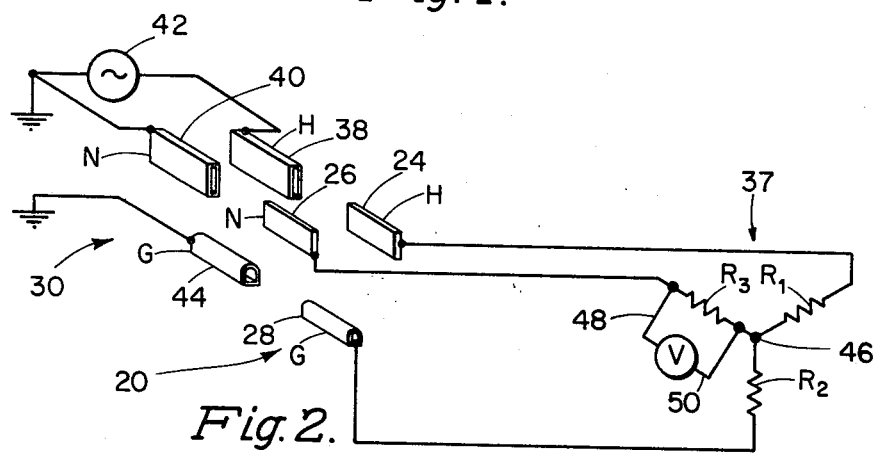
FIG. 2 is a schematic illustration of a three-wire outlet and a novel test circuit following the principles of this invention.

FIGS. 1 and 2 illustrate a first embodiment of the invention. FIG. 1 depicts a commercial three-wire AC outlet test instrument incorporating the invention, comprising a housing 14 containing an AC electrical meter 16 and including a selector dial 18 for operating the instrument in various test modes. A three-wire plug 20 is connected to a novel test circuit within the housing 14 by a three-wire cable 22. The plug 20 includes a line probe 24, a neutral probe 26, and a ground probe 28 adapted for insertion into a conventional three-wire AC outlet 30.

As will be explained in detail hereinafter, the meter 16, which may be a voltmeter or an ammeter, is illustrated as having a scale 32 on which is marked a plurality of zones 34a, 34b, 34c, and 34d (see FIG. 1A). Each zone carries a legend identifying a particular wiring connection pattern which can exist in a tested outlet. As will become evident hereinafter, to test an outlet, the user simply inserts the plug 20 into the outlet and obtains an immediate identification of the wiring connection pattern in the outlet by noting the location of the meter needle 36 on a particular zone on the scale.

FIG. 2 schematically depicts a novel test circuit embodying the teachings of the invention. A hypothetical outlet 30 to be tested is illustrated diagrammatically as comprising hot (line) and neutral terminals 38, 40, a schematic representation of a line voltage generator 42 (in reality, normally the secondary winding of a power transformer) connected between terminals 38, 40, and a ground terminal 44. A plug 20 for connecting the test circuit 37 to the outlet 30 is conventional and includes a line probe 24, a neutral probe 26, and a ground probe 28. The FIG. 2 test circuit embodiment, like the FIG. 7 embodiment (to be described below) comprises circuit branches between each of the probes 24, 26, and 28 and a common terminal, each of the branches containing resistance means. The leads of an AC electrical meter are connected in one of the circuit branches, whereby different wiring connection patterns in a tested outlet produce different series-parallel connections of the resistance means in the circuit branches and thus produce different output states of the meter indicative of the different wiring connection patterns in the outlet.

More particularly, in FIG. 2, a first circuit branch connected between line probe 24 and a common terminal 46 contains resistance means illustrated as a resistor $R_1$. A second circuit branch connected between the ground probe 28 and the common terminal 46 contains resistance means illustrated as constituting a resistor $R_2$. A third circuit branch connected between neutral probe 26 and the common terminal 46 contains resistance means here illustrated as constituting a resistor $R_3$.

An AC electrical meter, shown for illustrative purposes only as being a voltmeter, designated symbolically by a circled "V", has a pair of leads 48, 50 connected to the meter terminals and across resistor $R_3$ in the third circuit branch. The meter 16 may, in an alternative embodiment, be connected in the first or second circuit branches.

Figure 3:
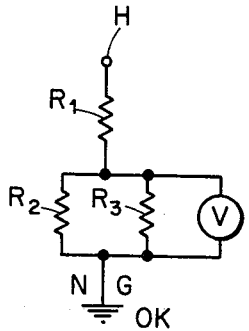
FIGS. 3–6 are schematic diagrams illustrating the various series-parallel connections of resistors $R_1$, $R_2$, and $R_3$ in FIG. 2 the test circuit when the tested outlet has indicated connection patterns.

FIGS. 3–6 illustrate the series-parallel connections of the resistors $R_1$, $R_2$, and $R_3$ which are established when various circuit connection patterns are present in the tested outlet 30. For example, FIG. 3 representing the interconnection of resistors $R_1$, $R_2$, and $R_3$ when the tested outlet is wired correctly, takes the form of resistor $R_1$ in series with a parallel combination of resistors $R_2$ and $R_3$. The meter is connected across the parallel-connected combination of resistors $R_2$ and $R_3$.

Figure 4:
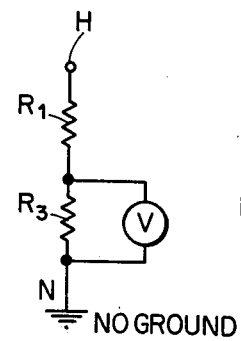

Referring to FIG. 4, with an open ground in the tested outlet the test circuit diagram takes the form of resistor $R_1$ in series with resistor $R_3$, the meter indicating the voltage drop across $R_3$ alone.

Figure 5:
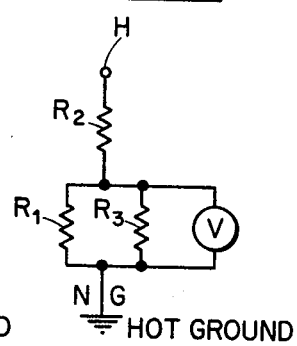
Figure 6:
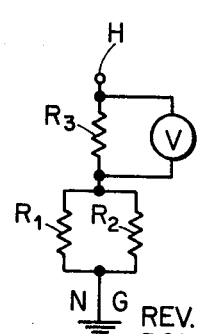

Likewise, if the tested outlet should have reversed line and ground connections, ( a "hot ground") as shown in FIG. 5, the meter needle deflection indicates the voltage drop across the parallel combination of resistors $R_1$ and $R_3$. Finally, as shown in FIG. 6, an outlet connected with reversed line and neutral connections (i.e., with "reversed polarity") will produce a test circuit diagram wherein $R_3$ is in series with the parallel combination of $R_1$ and $R_2$. An absence of line voltage in the outlet is indicated by a zero meter reading.

It is obvious that if resistors $R_1$, $R_2$, and $R_3$ have different resistance values, the meter reading for each of the five outlet wiring connection patterns described will be different. It is desirable that $R_1$, $r_2$, and $R_3$ be selected to have values which cause the needle deflections corresponding to the various outlet wiring connection patterns to be spaced on the meter scale, in the interest of ease and accuracy in reading the meter.

For example, if $R_1$, $R_2$, and $R_3$ have relative resistance values of unity, one-third, and two-thirds, respectively, the zones 34a, 34b, 34c, and 34d are substantially evenly spaced across a portion of the meter scale 32 (see FIG. 1). It is preferred, to eliminate the need for interpretation of meter readings, to place in the vicinity of each of the zones 34a, 34b, 34c, and 34d, a legend which describes the particular wiring connection pattern characterized by a needle deflection to that zone. Thus, in FIG. 1, the zones 34a, 34b, 34c, and 34d are labeled (with appropriate abbreviations) OK, NO GROUND, HOT GROUND, and POLARITY REVERSED, respectively.

In operation, the user of the instrument merely inserts the plug 20 into the outlet to be tested and reads the meter 16. A deflection of the needle 36 to a particular zone on the scale 32 uniquely indicates that the designated wiring connection pattern is present in the outlet. Further, the location of the needle 36 in the zone gives a measure of absolute line voltage present in the tested outlet. Thus, in addition to identifying the outlet wiring connection patter, the instrument also tells the user whether or not the tested outlet has appropriate line voltage applied thereto.

Figure 7:
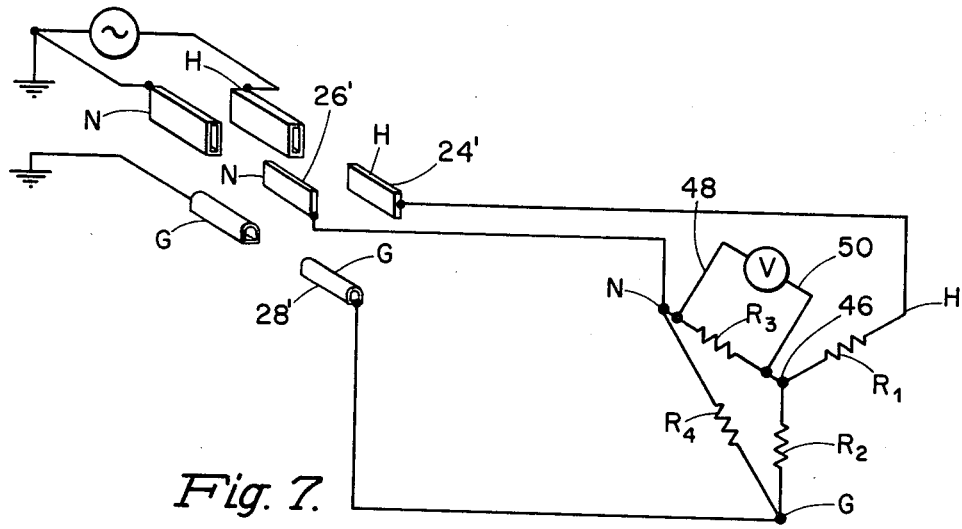
FIG. 7 is a schematic diagram of another test circuit constructed in accordance with this invention.
Figure 8:
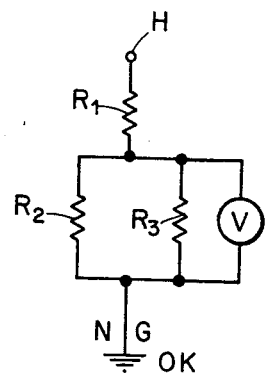
FIGS. 8–12 are schematic diagrams illustrating the various series-parallel connections of resistors $R_1$, $R_2$, $R_3$, and $R_4$ in the FIG. 7 test circuit when the tested outlet has the indicated connection patterns.
Figure 9:
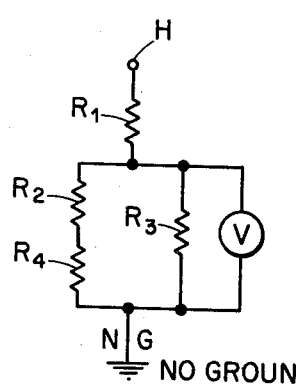
Figure 10:
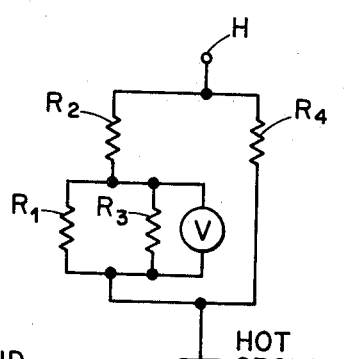
Figure 11:
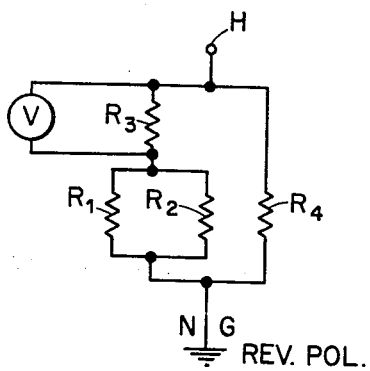
Figure 12:
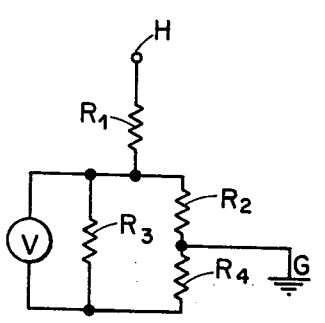

A second embodiment of the invention is shown in FIG. 7. The FIG. 7 test circuit is similar to the FIG. 2 test circuit except that a resistor $R_4$ connected between the neutral probe 26' and ground probe 28' enables an open neutral connection in an outlet to be detected. FIGS. 8–12 are circuit diagrams representing the series-parallel interconnections of resistances $R_1$, $R_2$, $R_3$, and $R_4$ when the tested outlet has the wiring connection patterns identified by the legend beneath each of these figures. The meter connected across resistor $R_3$ will produce a different and thus unambiguous reading for each of the six basic outlet wiring connection patterns if the $R_1$, $R_2$, $R_3$, and $R_4$ resistors have appropriately different values.

As in the FIG. 2 embodiment, it is desirable that resistors $R_1$, $R_2$, $R_3$, and $R_4$ are selected such that the zones on the meter scale which indicate the various wiring connection patterns are spaced on the meter scale. One of the combinations which produces a substantially even spacing of the zones is that resistors $R_1$, $R_2$, $R_3$, and $R_4$ have relative resistance values of 1.00, 0.40, 0.67, and 1. 60, respectively.

It is obvious that whereas meter 16 has four marked zones identifying different outlet wiring connection patterns, an instrument employing the FIG. 7 circuit would have five distinct zones. The fifth zone not shown in FIG. 1 would identify and be designated NO NEUTRAL.

Figure 13:
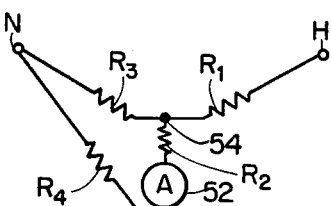
FIG. 13 illustrates diagrammatically a third test circuit embodiment reflecting the teachings of this invention.

FIG. 13 illustrates yet another embodiment of the invention. The FIG. 13 test circuit is quite similar to the FIG. 7 embodiment but has an ammeter 52, rather than a voltmeter, connected between the common terminal 54 and the ground probe in series with resistor $R_3$. It is manifest from the above discussion that different wiring connection patterns in a tested outlet will result in different current flows through the ammeter 52, different output indications of the ammeter 52 being associated with different wiring connection patterns in the tested outlet. As will become readily evident upon inspection, the FIG. 13 circuit is capable of detecting five different wiring connection patterns in a tested outlet.

By this invention, then, a test instrument is provided for rapidly, positively, and unambiguously identifying the six basic wiring connection patterns which may exist in a tested three-wire AC outlet. The user simply reads the meter scale and notes which zone the meter needle is pointing to--no interpretation of the signal is required. Further, the user receives simultaneously an indication of whether or not the tested outlet is receiving proper line voltage.

The invention is not limited to the particular details of construction of the embodiments depicted, and it is contemplated that various and other modifications and applications will occur to those skilled in the art. For example, whereas the indicator is necessarily a voltmeter or an ammeter, it need not be a voltmeter or ammeter of the type employing a needle and a moving coil. Others may be used, such as an optical ribbon indicator, a flag indicator, a moving light projected on a screen, a line or spot on a cathode-ray tube, a digital voltmeter, or any indicator in which an indication (preferably visible) proportional to an input electrical current or voltage is produced. As used herein the terms "AC electrical measuring means" and "AC electrical meter means" are intended to encompass all indicators of this type. Rather than using resistors in the circuit branches, other impedances, such as capacitors, inductors, etc. may be employed. Rather than using a plug on a cord to carry the ground, neutral, and line probes, the probes may be rigidly attached to the housing for the meter and test circuit. As pointed out, certain changes may be made in the above-described product without departing from the true spirit and scope of the invention herein involved, and it is intended that the subject matter of the above depiction shall be interpreted as illustrative and not in a limiting sense.

What is claimed is:

1. An instrument for testing wiring connection patterns in a three-wire AC electrical outlet which includes a line voltage terminal, a neutral terminal, and a ground terminal, comprising:
    a three-wire plug adapted for insertion into an outlet to be tested comprising a line probe, a neutral probe, and a ground probe;
    AC electrical meter means including a pair of leads and a needle deflectable over a scale including a plurality of zones marked with indicia identifying different wiring connection patterns which may exist in the outlet; and
    test circuit means connecting said plug and said meter means, comprising:
    a first circuit connected between said line probe and a central terminal, said first branch including first resistance means;
    a second circuit branch connected between said ground probe and said central terminal, said second branch including second resistance means, and
    a third circuit branch connected between said neutral probe and said central terminal, said third circuit branch including third resistance means, said first, second, and third resistance means having mutually different values, and means for connecting said leads of said meter means in one of said circuit branches such that the deflection of said meter needle is indicative of the absolute current flow in said one branch and in said test circuit means, different wiring connection patterns in a tested outlet producing different series-parallel connections of said first, second, and third resistance means and different current flows in said one branch, each of said zones being positioned on said scale such that a needle deflection to a particular zone indicates that a particular wiring connection pattern exists in the outlet, the location of said needle in a particular zone being indicative of the absolute line voltage on the line voltage terminal in the outlet.

2. The instrument defined by claim 1 wherein said first, second, and third resistance means are selected to produce a substantially even spacing of said zones on said meter scale.

3. The instrument defined by claim 2 wherein said resistance values of said first, second, and third resistance means have relative values of unity, one-third, and two-thirds, respectively.

4. The instrument defined by claim 3 wherein said leads of said meter means are connected in said third circuit branch.

5. The instrument defined by claim 1 wherein said test circuit means further includes fourth resistance means connected between said neutral probe and one of the remaining two probes.

6. The instrument defined by claim 5 wherein said first, second, third, and fourth resistance means are selected to produce a substantially even spacing of said zones on said meter scale.

7. The instrument defined by claim 6 wherein said fourth resistance means is connected between said neutral probe and said ground probe.

8. The instrument defined by claim 7 wherein said resistance values of said first, second, third, and fourth resistance means have relative values of 1.00, 0.40, 0.67, and 1.60, respectively.

* * * * *